(12) United States Patent
Nakahara

(10) Patent No.: US 7,831,138 B2
(45) Date of Patent: Nov. 9, 2010

(54) FOCUS ADJUSTING METHOD AND FOCUS ADJUSTING DEVICE

(75) Inventor: Naoto Nakahara, Saitama (JP)

(73) Assignee: HOYA Corporation, Tokyo (JP)

( * ) Notice: Subject to any disclaimer, the term of this patent is extended or adjusted under 35 U.S.C. 154(b) by 195 days.

(21) Appl. No.: 12/177,421

(22) Filed: Jul. 22, 2008

(65) Prior Publication Data
US 2009/0028539 A1   Jan. 29, 2009

(30) Foreign Application Priority Data
Jul. 24, 2007   (JP) ............................ 2007-191729

(51) Int. Cl.
G03B 3/10 (2006.01)
G03B 7/099 (2006.01)
G03B 13/00 (2006.01)

(52) U.S. Cl. .................. 396/121; 396/116; 348/349

(58) Field of Classification Search .................. 396/103, 396/104, 116, 121, 124; 348/345, 349, 353–354
See application file for complete search history.

(56) References Cited

U.S. PATENT DOCUMENTS

| 5,249,058 A | 9/1993 | Murata et al. |
| 2006/0238640 A1* | 10/2006 | Hofer ......................... 348/345 |
| 2007/0215791 A1 | 9/2007 | Yamamoto |
| 2007/0280665 A1 | 12/2007 | Nakahara |
| 2007/0280666 A1 | 12/2007 | Nakahara |
| 2007/0285556 A1 | 12/2007 | Nakahara |
| 2008/0136958 A1 | 6/2008 | Nakahara |
| 2008/0143866 A1 | 6/2008 | Nakahara |

FOREIGN PATENT DOCUMENTS

| JP | 3-68280 | 3/1991 |
| JP | 2002311325 A * | 10/2002 |

OTHER PUBLICATIONS

JP-2002311325 A Machine Translation.*
English language Abstract of JP 3-68280, Mar. 25, 1991.

* cited by examiner

*Primary Examiner*—W. B. Perkey
*Assistant Examiner*—Minh Q Phan
(74) *Attorney, Agent, or Firm*—Greenblum & Bernstein, P.L.C.

(57) ABSTRACT

A focus adjusting method for adjusting focus by moving a focusing lens group of a photographing optical system, wherein the focus adjusting method includes a first search stage at which a focus search operation is performed based on an image formed in a large focus area while the focusing lens group is moved stepwise over an entire range of movement thereof from the near extremity to the far extremity, and a second search stage at which the focus search operation is performed, based on images formed in small focus areas, at front and rear close vicinities of the in-focus position while the focusing lens group is moved stepwise over a portion of the entire range of movement thereof.

16 Claims, 10 Drawing Sheets

Short-Distance                                  Far-Extremity

Short-Distance                                  Far-Extremity

Short-Distance                                  Far-Extremity

Fig. 7A 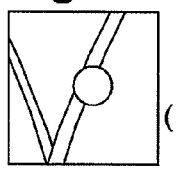 (α) 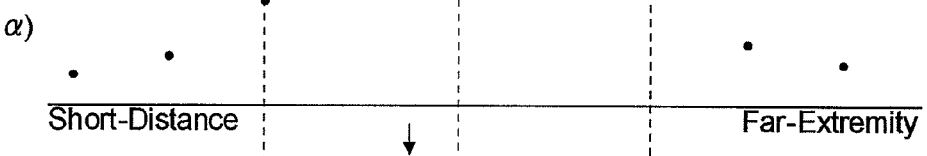
Fig. 7B  (a) 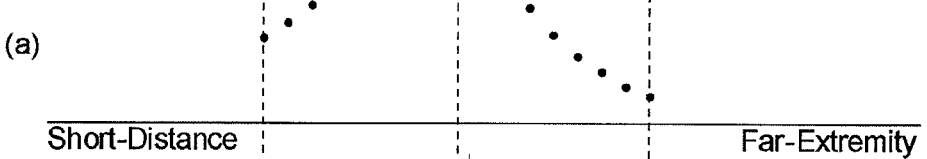
Fig. 7C  (b) 
Fig. 7D  (c) 
Fig. 7E  (d) 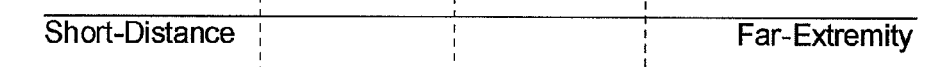
Fig. 7F  (e) 

FOCUS ADJUSTING METHOD AND FOCUS ADJUSTING DEVICE

BACKGROUND OF THE INVENTION

1. Field of the Invention

The present invention relates to a focus adjusting method and a focus adjusting device for adjusting a focus in accordance with contrasts of images captured at different positions of a focusing lens group.

2. Description of the Prior Art

Digital cameras with a contrast-detection type autofocusing system (hereinafter referred to an AF system) which detects a focus state (in-focus position) by performing a focus search operation are known in the art. In the focus search operation, images are captured consecutively at different positions of a focusing lens group while the focusing lens group is being moved stepwise from a search start extremity, which is one of the infinite focus position (far extremity/position for bringing an object at infinity into focus) and the closest (shortest) focus position (near extremity/position for bringing an object at the shortest distance in working range into focus), to a search end extremity (the other of the infinite focus position and the closest focus position) after having been moved to the search start extremity to detect a focus state (in-focus lens position) based on contrasts of the captured images. This type of AF system is disclosed in U.S. Pat. No. 5,249,058. Additionally, a camera having such an AF system is known in the art in which the focus search operation is performed firstly over the entire distance range coarsely at wide intervals (with a coarse pitch of movement of the focusing lens group) to detect the position of the focusing lens group at which a peak contrast value is obtained, and secondly over a narrow distance range in the vicinity of the detected peak-contrast position finely at narrow intervals (with a fine pitch of movement of the focusing lens group) to detect an in-focus position of the focusing lens group to speed up the operation of the aforementioned conventional AF system.

Such a two-stage (step) focus search operation makes it possible to obtain contrast values as evaluation values at fine steps and is effective at improving the accuracy of peak approximation because the frame rate is set higher in the second focus search operation (fine focus search operation) than the frame rate in the first focus search operation (coarse focus search operation), and also because the lens drive speed is changed to a low speed while the pitch of movement of the focusing lens group is changed to a narrow pitch in the second focus search operation.

When images of objects at far and near distances exit simultaneously in the same focus area (generally defined by an AF frame), peak contrast values of the object images at far and near distances do not exert an influence on each other if the object images are sufficiently apart from each other, provided that the focus area for obtaining evaluation values when the coarse focus search operation is performed and the focus area for obtaining evaluation values when the fine focus search operation is performed are identical in size to each other. However, the closer the object images in the same focus area, the more the respective peak contrasts start to merge, so that it is difficult to obtain precise peak contrast positions.

SUMMARY OF THE INVENTION

The present invention provides a focus adjusting method and a focus adjusting device which can improve the focusing accuracy and speed up the focusing operation.

According to an aspect of the present invention, a focus adjusting method is provided for adjusting focus by moving a focusing lens group of a photographing optical system, wherein the focus adjusting method performs a focus search process in which a focus state is obtained to detect an in-focus position of the focusing lens group based on a contrast of an image formed by the photographing optical system, in one of at least one large focus area and each of a plurality of small focus areas included in the large focus area, while the focusing lens group is moved stepwise from one toward the other of a near extremity and a far extremity, and moves the focusing lens group to the in-focus position, wherein the focus adjusting method includes a first search stage at which a focus search operation is performed based on an image formed in the large focus area while the focusing lens group is moved stepwise over an entire range of movement thereof from the near extremity to the far extremity, and a second search stage at which the focus search operation is performed, based on images formed in the plurality of small focus areas, at front and rear close vicinities of the in-focus position while the focusing lens group is moved stepwise over a portion of the entire range of movement thereof.

It is desirable for the focusing lens group to be moved stepwise by a first pitch of movement at the first search stage, and for the focusing lens group to be moved stepwise by a third pitch of movement at the second search stage, the third pitch of movement being narrower than the first pitch of movement.

It is desirable for the focus adjusting method to include a focusing drive stage which is performed after the second search stage and at which the focusing lens group is moved to an in-focus position obtained at the second search stage.

It is desirable for the focus adjusting method to include a third search stage which replaces the second search stage when the in-focus position is not obtained at the first search stage. At the third search stage, the focus search operation is performed based on the image formed in the large focus area while the focusing lens group is moved stepwise over the entire range of movement thereof with a second pitch of movement which is narrower than the first pitch of movement and wider than the third pitch of movement.

It is desirable for the focus adjusting method to include a fourth search stage, at which the focus search operation is performed based on the images formed in the plurality of small focus areas while the focusing lens group is moved stepwise over a portion of the entire range of movement thereof at front and rear close vicinities of an in-focus position obtained at the third stage.

It is desirable for the focus adjusting method to include a focusing drive stage which is performed after the fourth search stage and at which the focusing lens group is moved to an in-focus position obtained at the fourth search stage.

It is desirable for the focus adjusting method to include a fifth search stage at which the focus search operation is performed based on the images formed in the plurality of small focus areas while the focusing lens group is moved stepwise over the entire range of movement thereof by the third pitch when the in-focus position is not obtained at the third search stage.

It is desirable for the focus adjusting method to include a focusing drive stage which is performed after the fifth search stage and at which the focusing lens group is moved to an in-focus position obtained at the fifth search stage.

It is desirable for the plurality of small focus areas to include first small focus areas formed by dividing the wide focus area, and a second small focus area which overlap the first small focus areas.

In the case where the large focus area includes a plurality of large focus areas, it is desirable for the second search stage, the third search stage, the fourth search stage and the fifth search stage to be carried out on one of the plurality of large focus areas in which an in-focus position at a shortest distance is obtained at the first search stage and on the plurality of small focus areas included in the one of the plurality of large focus areas.

It is desirable for the second search stage, the third search stage, the fourth search stage and the fifth search stage to be carried out in the case where the in-focus position obtained at the first search stage is closer to a predetermined distance.

It is desirable for the focus adjusting method to include a focusing drive stage at which the focusing lens group is moved to the in-focus position in the case where the in-focus position is not closer to the predetermined distance.

It is desirable for the focus adjusting method to include a photographing-mode selecting stage for selecting a photographing mode from among various photographing modes including macro mode and super-macro mode, wherein the first search stage and subsequent search stages are carried out in the case where one of the macro mode and the super-macro mode is selected at the photographing-mode selecting stage. The focus adjusting method further includes a focusing drive stage at which a focus search operation is performed based on the image formed in the large focus area while the focusing lens group is moved stepwise over the entire range of movement thereof to move the focusing lens group to an in-focus position obtained by the focus search operation at the focusing drive stage.

It is desirable for the large focus area to be defined by an AF frame formed at a position corresponding to a center of a picture plane.

It is desirable for the large focus area to include a central large focus area and two side focus areas positioned on opposite sides of the central large focus areas, respectively. The central large focus area is defined by a spot AF frame, and a combination of the central large focus area and the two side focus areas are defined by a multi-zone AF frame which is greater in width than the spot AF frame.

In an embodiment, a focus adjusting device is provided, including a lens driving device for moving a focusing lens group of a photographing optical system stepwise in a range of movement from one toward the other of a near extremity and a far extremity; an image pickup device for capturing an image formed by the photographing optical system; and a controller which performs a focus search stage in which the image pickup device is activated to capture an object image at each of a plurality of different positions of the focusing lens group while the focusing lens group is moved stepwise from one toward the other of a near extremity and a far extremity to obtain an in-focus state based on a contrast of an image formed by the photographing optical system in one of at least one large focus area and each of a plurality of small focus areas included in the large focus area.

According to the present invention, the focusing accuracy can be improved with no need to increase the time required for focus adjustment because firstly an approximate in-focus position is detected in accordance with an image formed in the large focus area, and subsequently a precise in-focus position is detected over a limited (narrow) distance range in the neighborhood of the approximate in-focus position in accordance with an image formed in each small focus area.

The present disclosure relates to subject matter contained in Japanese Patent Application No. 2007-191729 (filed on Jul. 24, 2007) which is expressly incorporated herein by reference in its entirety.

BRIEF DESCRIPTION OF THE DRAWINGS

The present invention will be discussed below in detail with reference to the accompanying drawings, in which:

FIGS. 2A, 2B and 2C are illustrations showing the relationship between a spot AF mode and an AF frame (spot AF frame), wherein FIG. 2A shows the relationship between a picture plane and the spot AF frame, FIG. 2B shows the relationship between the spot AF frame and a unified (large) focus area, and FIG. 2C shows the relationship between the spot AF frame and multi-zone (small) focus areas;

FIGS. 3A, 3B and 3C are illustrations showing the relationship between a multi-point AF mode and an AF frame (multi-point AF frame), wherein FIG. 3A shows the relationship between a picture plane and the multi-point AF frame, FIG. 3B shows the relationship between the multi-point AF frame and a unified (large) focus area, and FIG. 3C shows the relationship between the multi-point AF frame and multi-zone (small) focus areas;

FIGS. 4A, 4B and 4C are illustrations showing the relationship between different positions of the focusing lens group and contrast values in a focus search process performed in the digital camera, wherein FIG. 4A shows a state where a coarse focus search operation and a fine focus search operation are performed with an object at a near distance and an object at a far distance being included in a focus area, FIG. 4B shows a state where a focus search operation is performed over the entire distance range with an object at a near distance and an object at a far distance being included in two different focus areas, respectively, and FIG. 4C shows another state where a focus search operation is performed over the entire distance range with an object at a near distance and an object at a far distance being included in two different focus areas, respectively;

FIGS. 5A, 5B, 5C, 5D and 5E are illustrations showing the relationship between an object image in a picture plane and focus areas when pictures are taken by the digital camera in macro mode, wherein FIG. 5A shows the entire picture plane, FIGS. 5B and 5C show the relationship between the unified focus area in the spot AF frame and an object image, FIG. 5D shows the relationship between the multi-zone focus areas in the spot AF frame and an object image, and FIG. 5E shows the relationship between each of the same multi-zone focus areas and an object image with the multi-zone focus areas being split;

FIGS. 6A and 6B are illustrations showing the relationship between different positions of the focusing lens group and contrast values in the case where the coarse focus search operation and the fine focus search operation are performed in the digital camera in accordance with an object image in the unified focus area in the spot AF frame, wherein FIG. 6A shows a state where the coarse focus search operation is performed and FIG. 6B shows a state where the fine focus search operation is performed;

FIG. 7A is an illustration showing a state where the coarse focus search operation is performed on an object image in the unified focus area in the spot AF frame, and FIGS. 7B, 7C, 7D, 7E and 7F are illustrations showing five different states where the fine focus search operation is performed on object images in the multi-zone (five) focus areas in the spot AF frame, respectively;

DESCRIPTION OF THE PREFERRED EMBODIMENT

Figure 1:
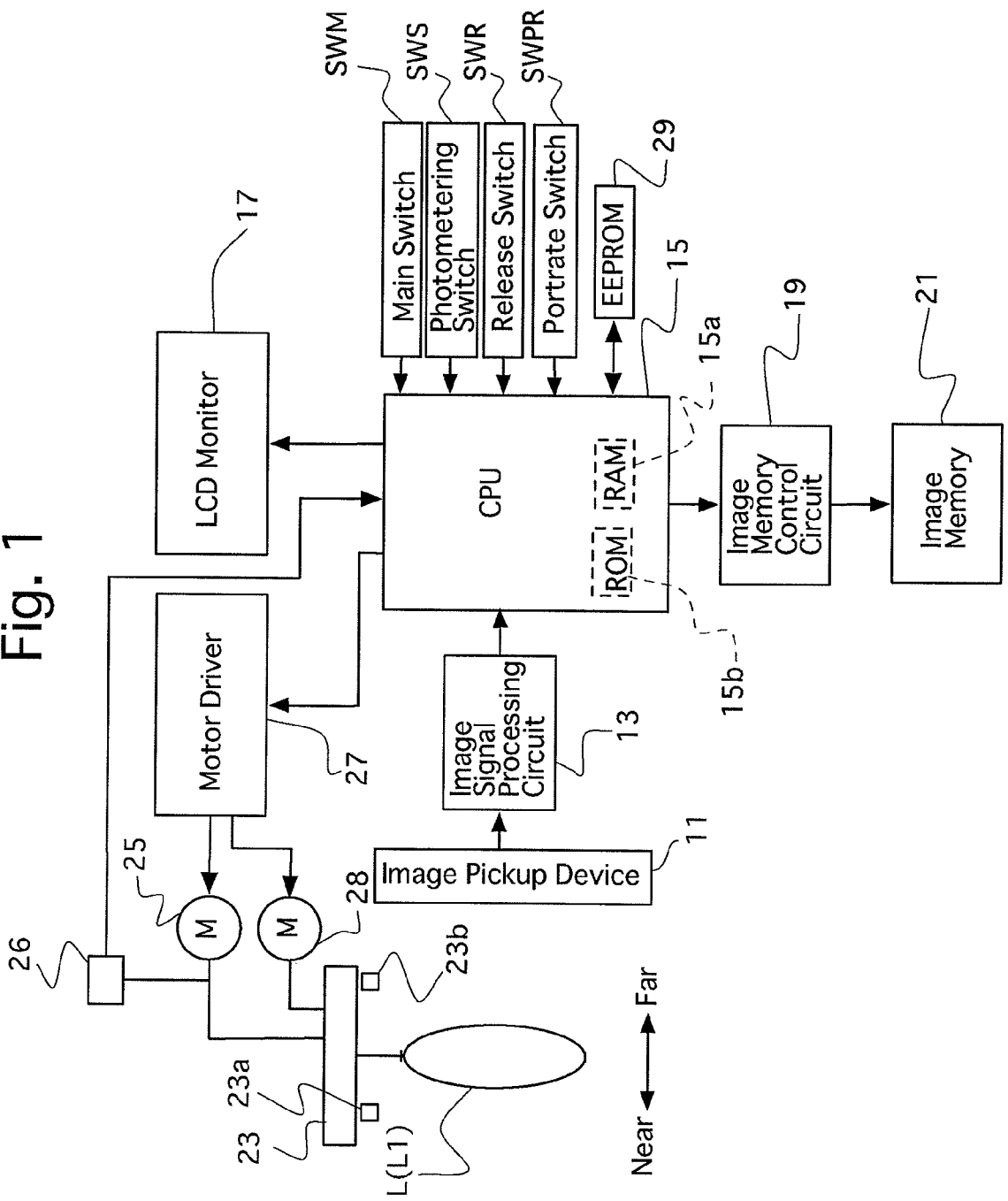
FIG. 1 is a block diagram of elements of an embodiment of a digital camera to which a focus adjusting method according to the present invention is applied, showing a primary configuration of the digital camera.

FIG. 1 is a block diagram of elements of an embodiment of a compact digital camera 10 having a contrast detection type of autofocusing system to which the present invention is applied, showing a basic configuration of the digital camera.

The digital camera 10 is provided with a zoom lens (photographing optical system) L including a focusing lens group L1, and an image pickup device 11 serving as an imaging device. An object image formed by the zoom lens L is focused onto a light receiving surface (picture plane) of the image pickup device 11 which is exposed thereto. The image pickup device 11 is a CCD or CMOS image sensor and includes a large number of pixels (photoelectric transducing elements) arranged in a two-dimensional matrix at predetermined intervals. The digital camera 10 is further provided with an image signal processing circuit 13, a CPU (controller) 15, a monitor (LCD) 17, an image memory control circuit 19 and an image memory 21. Each pixel of the image pickup device 11 converts the incident light of an object image thereon into an electrical charge, and the electrical charges are accumulated (integrated). Upon completion of an exposure, the accumulated charges are output, pixel by pixel, as an image signal to the image signal processing circuit 13. The image signal processing circuit 13 performs predetermined adjusting processes such as a white-balance adjusting process and an A/D converting process on the input image signal and outputs digital image data to the CPU 15. Namely, image data, which has undergone a predetermined process and converted into digital image data in units of pixels, is output to the CPU 15. The CPU 15 converts the image data, which are regularly input to the CPU 15 from the image pickup device 11, into an image signal capable of being indicated on the monitor 17 to visually indicate the image data as an image on the monitor 17 in a through mode (monitoring mode). When recording an image (image data), the CPU 15 performs an image capturing process in which the image pickup device 11 is exposed with settings such as an f-number and a shutter speed, and performs a recording process in which the input image data is converted into image data having a predetermined format to be written into the image memory 21 via the image memory control circuit 19. The digital camera 10 is further provided with an EEPROM 29 serving as a nonvolatile memory which is connected to the CPU 15. A predetermined format, variable data are written in the EEPROM 29.

As shown in FIG. 1, the digital camera 10 is provided with a main switch SWM, a photometering switch SWS and a release switch SWR, which are all connected to the CPU 15. In the normal contrast AF process, upon the photometering switch (first switch) SWS being turned ON, the CPU 15 performs a focus search process (focus scan process). Specifically, in this focus search process, the CPU 15 captures images consecutively via the image pickup device 11 while moving the focusing lens group L1 stepwise from the closest (shortest) focus position (near extremity/position for bringing an object at the shortest distance in working range into focus) to the infinite focus position (far extremity/position for bringing an object at infinity into focus), or vice versa, via a motor driver 27, an AF motor 25 and a lens drive mechanism 23, stores the captured images in an internal RAM 15a of the CPU 15, and detects contrasts (contrast values) of the captured images. Thereafter, a peak contrast value (peak contrast) is detected from the detected contrasts to obtain the position of the focusing lens group L1 at which this peak contrast value is obtained, i.e., an in-focus lens position of the focusing lens group L1 is obtained. Thereupon, the focusing lens group L1 is moved to the in-focus lens position thus obtained. Upon the release switch (second switch) SWR being turned ON, the CPU 15 carries out the aforementioned image capturing process and the aforementioned recording process, in which the input image data is written into the image memory 21. Images captured during the contrast AF process (see FIG. 9) and images captured after an in-focus state is achieved are normally indicated on the monitor 17 in the through mode.

In the present embodiment of the digital camera, two origin sensors 23a and 23b are used to detect the position (lens position) of the focusing lens group L1 in the optical axis direction. Specifically, the closest focus position (near extremity) and the infinite focus position (far extremity) of the focusing lens group L1 are detected by two origin sensors 23a and 23b as two points of origin of the focusing lens group L1, respectively. The CPU 15 counts the number of drive pulses for driving the AF motor 25 from each of the two points of origin of the focusing lens group L1 to detect the position of the focusing lens group L1 in the optical axis direction. The drive pulses are defined as pulses output from an encoder 26 such as a photo-interrupter which is connected to the output shaft of the AF motor 25 and which operates in association with the AF motor 25 when the AF motor 25 is driven. Although several hundreds of pulses or more are usually necessary for driving the focusing lens group L1 from the closest focus position to the infinite focus position, it is assumed that the focusing lens group L1 moves by one unit of movement constituting a unit of a plurality of pulses by driving the AF motor 25 stepwise by several pulses or several dozen pulses, and that only ten or so steps are necessary for driving the focusing lens group L1 from the closest focus position to the infinite focus position in the contrast AF process in the present embodiment of the digital camera for the purpose of simplifying the description. In addition, regarding the number of drive pulses for detecting the position of the focusing lens group L1, it is assumed that the aforementioned unit of a plurality of pulses is counted as one drive pulse.

In addition, in the present embodiment of the digital camera, the number of lens-position pulses which represents the position of the focusing lens group L1 is represented by a lens-position pulse number (variable) PN which is incremented by one every time the encoder 26 outputs one pulse (drive pulse) when the AF motor 25 is driven to move the focusing lens group L1 from the closest focus position toward the infinite focus position, and the lens-position pulse number PN is 0 when the focusing lens group L1 is positioned at the closest focus position. In the case where a focus search operation in which the focusing lens group L1 is moved from the infinite focus position toward the closest focus position is performed, the lens-position pulse number PN at the infinite focus position of the focusing lens group L1 is set to a maximum value, and the lens-position pulse number PN is decremented by one every time the focusing lens group L1 is driven toward the closest focus position by one drive pulse.

The digital camera 10 is provided therein with a zoom motor 28 for driving the zoom lens L via a zooming mechanism incorporated in the lens drive mechanism 23. The focal length of the zoom lens L is detected by an encoder (not shown) incorporated in the lens drive mechanism 23.

Figure 2A:
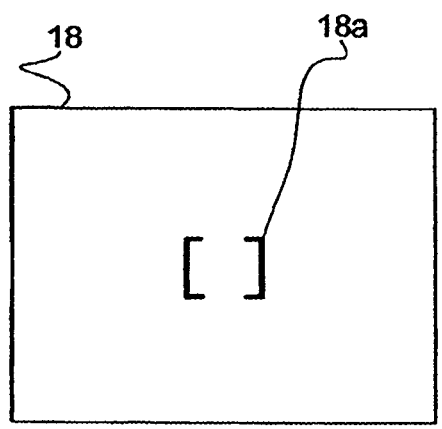
Figure 2B:
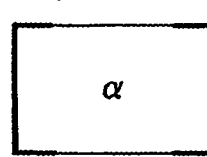
Figure 2C:
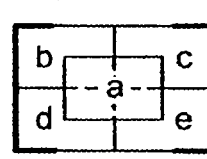
Figure 3A:
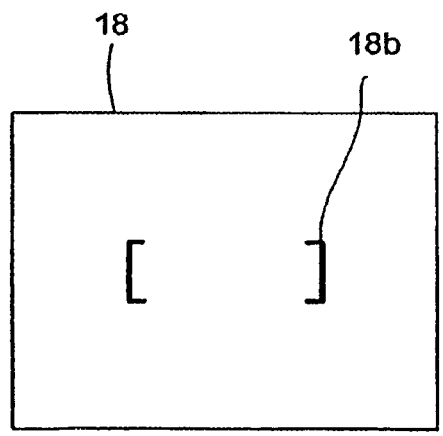
Figure 3B:
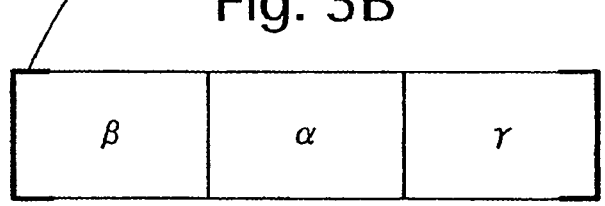
Figure 3C:
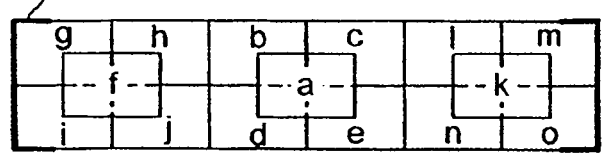

The digital camera 10 is provided with different AF modes, i.e., a spot AF mode and a multi-point AF mode. A focal point for bringing an object image in a single focus area at the central position of the picture plane 18 into focus is detected in the spot AF mode, and a focal point for bringing an object image in each of a plurality of focus areas at different positions in the picture plane (one of which is the central position of the picture plane) into focus (into a depth of focus) is detected in the multi-point AF mode. FIG. 2A shows the relationship between the spot AF mode and an AF frame (narrow AF frame/spot AF frame) 18a, and FIG. 3A shows the relationship between the multi-point AF mode and an AF frame (wide AF frame/multi-point AF frame) 18b. FIG. 2B shows a focus area (small focus area) when a coarse focus search operation is performed in the spot AF mode, and FIG. 3B shows a focus area when the coarse focus search operation is performed in the multi-point AF mode. FIG. 2C shows a focus area when a fine focus search operation is performed in the spot AF mode, and FIG. 3C shows a focus area when the fine focus search operation is performed in the multi-point AF mode.

In the spot AF mode, a focus search operation is performed on an object image in the narrow AF frame 18a that defines the aforementioned small focus area. The narrow AF frame 18a is formed by left and right visual square brackets. The narrow AF frame 18a defines a unified focus area (large focus area) α, the entire part of which serves as a single focus area for focusing, while the narrow AF frame 18a defines five different focus areas, i.e., multi-zone focus areas (divisional focus areas/small focus areas) a, b, c, d and e for focusing on each divisional focus area. The four divisional focus areas b, c, d and e correspond to four-divided areas of the unified focus area α, respectively, and the divisional focus area 'a' that is positioned at the center of unified focus areas includes inner parts of the four divisional focus areas b, c, d and e in the vicinity of the center of the narrow focus frame 18a.

In the multi-point AF mode, a focus search operation is performed on an object image in the wide AF frame 18b. The wide AF frame 18b is formed by left and right visual square brackets positioned on the left and right outer sides of the narrow AF frame 18a, respectively. The wide AF frame 18b defines a combination of three unified focus areas (large focus areas), i.e., the aforementioned unified focus area α, and two unified focus areas β and γ which are positioned on the horizontally opposite sides of the unified focus area α, respectively, so that the three unified focus areas β and γ serve as a single focus area for focusing, similar to the narrow focus frame 18a. Additionally, the wide AF frame 18b defines fifteen different focus areas, i.e., the aforementioned five multi-zone focus areas a, b, c, d and e, five multi-zone focus areas f, g, h, i and j (divisional focus areas) for focusing on each divisional focus area, and five multi-zone focus areas (divisional focus areas) k, l, m, n and o for focusing on each divisional focus area. The four divisional focus areas g, h, i and j correspond to four-divided areas of the unified focus area β, respectively, and the divisional focus area f that is positioned at the center of the unified focus area β includes inner parts of the four divisional focus areas g, h, i and j in the vicinity of the center of the unified focus areas β. Likewise, the four divisional focus areas l, m, n and o correspond to four-divided areas of the unified focus area γ, respectively, and the divisional focus area k that is positioned at the center of the unified focus area γ includes inner parts of the four divisional focus areas l, m, n and o in the vicinity of the center of the unified focus areas γ.

The present embodiment of the digital camera has the capability of carrying out a focus search (scanning) operation with different degrees of accuracies, e.g., performing a coarse focus search operation and a fine focus search operation. In the coarse focus search operation, the focusing lens group L1 is driven at a high speed, i.e., the lens-stopping interval is relatively wider (longer) so that one unit (distance) of movement of the lens is long. In the fine focus search operation, the focusing lens group L1 is driven at a low speed, i.e., the lens-stopping interval is relatively narrower (shorter) so that one unit (distance) of movement of the lens is short. A focusing operation is performed on each of the three focus areas α, β and γ in the coarse focus search operation, while a focusing operation is performed on each of the fifteen divisional focus areas a through o in the fine focus search operation.

Figure 4A:
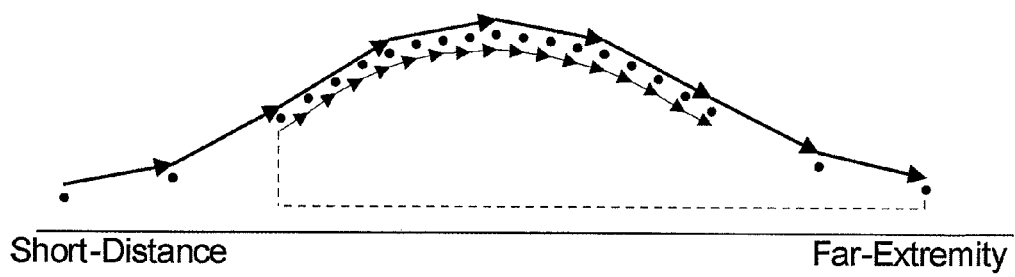
Figure 4B:
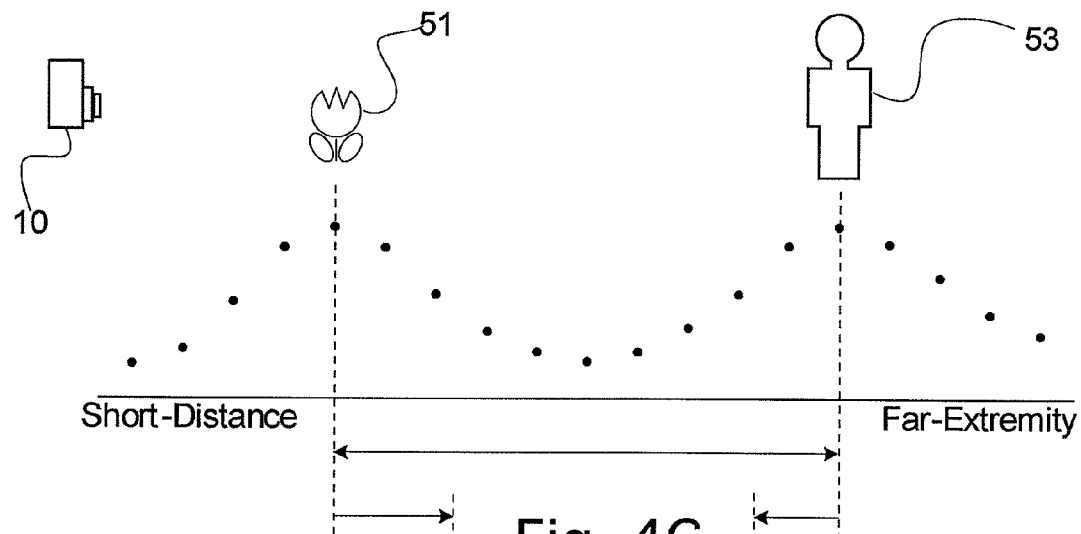
Figure 4C:
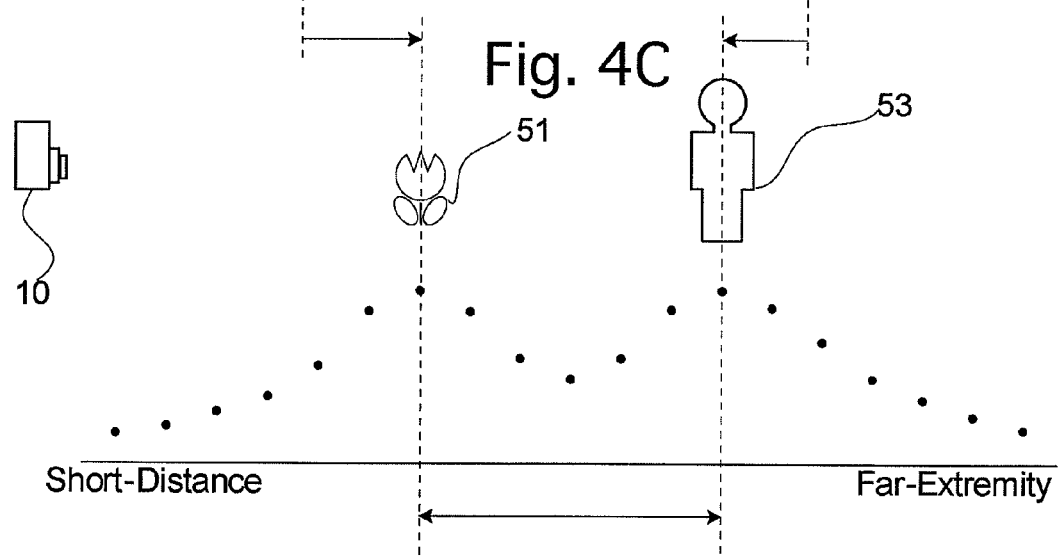

The relationship between different positions of the focusing lens group L1 and contrast values detected thereat, respectively, in the focus search process will be hereinafter discussed with reference to FIGS. 4A, 4B and 4C. In the present embodiment of the digital camera, when the focus search process is performed for the first time from an out-of-focus state in the spot AF mode, the coarse focus search operation is performed over the entire distance range (from the near extremity to the far extremity), and subsequently, if a peak contrast value is obtained by this coarse focus search operation, the fine focus search operation is performed over a predetermined (narrow/limited) distance range in the neighborhood of the position of the focusing lens group L1 at which the peak contrast value has been obtained (see FIG. 4A). In this particular embodiment, the pitch of movement of the focusing lens group L1 in the coarse focus search operation is quadruple the pitch of the movement of the focusing lens group L1 in the fine focus search operation.

Supposing that a near distance object 51 and a far distance object 53 are included in the spot AF frame 18a at the same time, contrast values are detected at different positions of the focusing lens groups L1, respectively, with the near distance object 51 and the far distance object 53 overlapping each other, so that the variations of contrast caused by variations in position of the focusing lens group L1 become gentle in the coarse focus search operation. However, if contrast values of the near distance object 51 and the far distance object 53 are independently detected, a peak contrast value appears on each of the near distance object 51 and the far distance object 53 (see FIGS. 4B and 4C). Nevertheless, if a focus search operation is performed with a focus area including the near distance object 51 and the far distance object 53 at the same time, a gentle contrast peak positioned between images of the near distance object 51 and the far distance object 53 is obtained as shown in FIG. 4A. In this case, even if the fine focus search operation is performed over a predetermined narrow distance range in the neighborhood of the position of the focusing lens group L1 at which this peak contrast value is obtained, a peak contrast value cannot be obtained on each of the near distance object 51 and the far distance object 53.

Figure 5A:
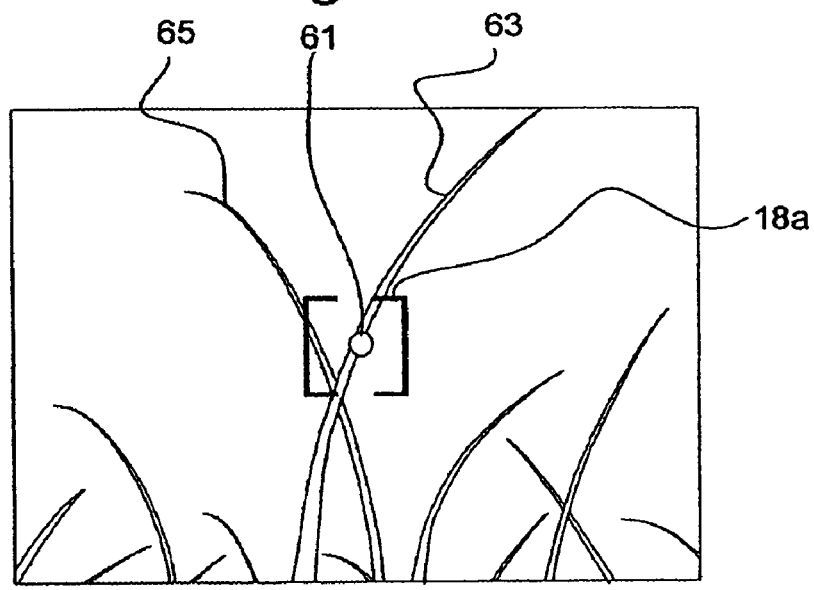
Figure 5B:
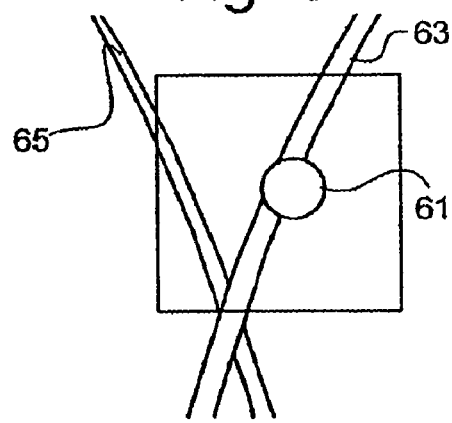
Figure 5C:
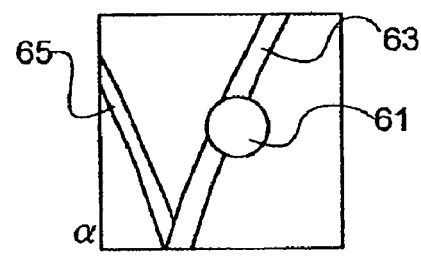

Additionally, it is sometimes the case that objects at near and far distances which overlap each other in the forward-rearward direction are included in an AF frame. This situation often happens, especially in macro (close-up) photography. FIG. 5A shows an example of this state. In this state, in the image in the spot AF frame 18a, i.e., in the unified focus area α, a blade of grass 63 at a near distance and a blade of grass 65 at a far distance intersect each other as viewed from the digital camera 10; furthermore, an insect 61 is on the blade of grass 63 (see FIGS. 5B and 5C).

Figure 6A:
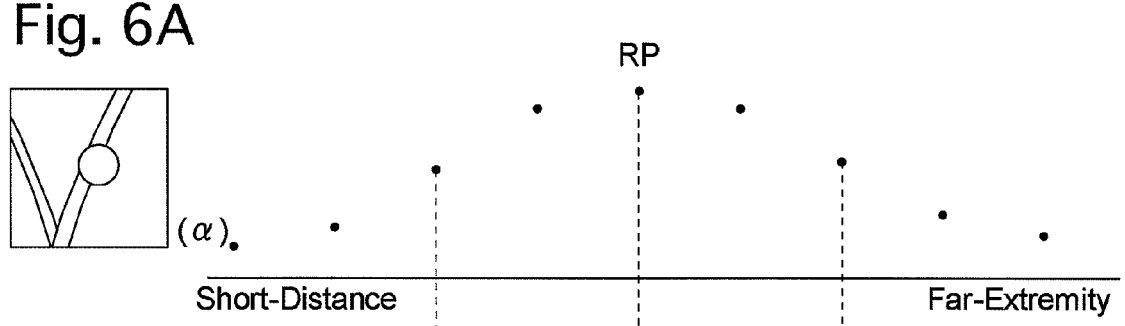
Figure 6B:
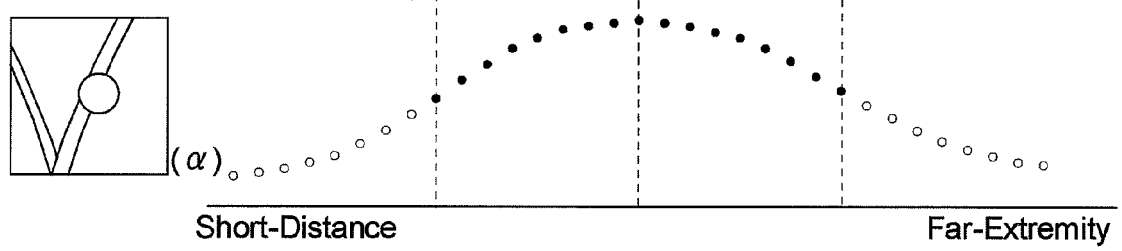

In this state, if the coarse focus search operation is performed with the unified focus area α, a position RP of the focusing lens group L1 at which a peak contrast value is obtained is detected based on the average of the brightness of the grass blades 63 and 65 and the insect 61 (see FIG. 6A). In the case of such objects of a photograph, a position of the focusing lens group L1 at which a peak contrast value is obtained is detected based on the average of the brightness of the grass blades 63 and 65 and the insect 61. even if the fine focus search operation (in which the pitch of the movement of the focusing lens group L1 is narrower than that in the coarse focus search operation) is performed (see FIG. 6B).

Figure 5D:
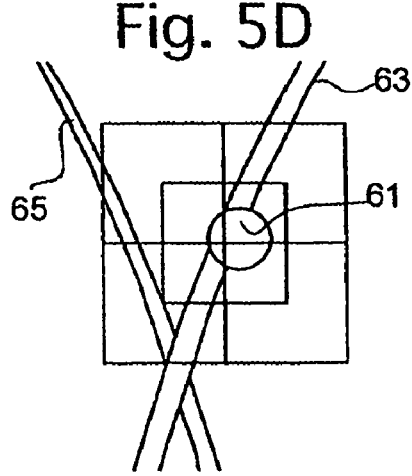
Figure 5E:
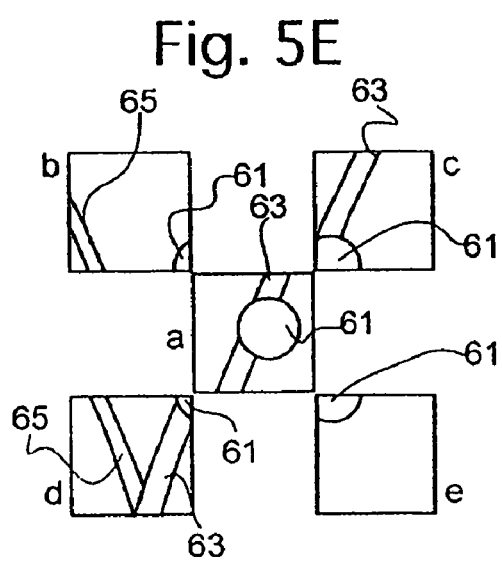

On the other hand, as shown in FIG. 5D, there is little chance of each of the multi-zone focus areas a through e including objects at near and far distances at the same time, there is little chance of each of the multi-zone focus areas a through e including objects at near and far distances at the same time at substantially the same area ratio, there is a high chance of each of the multi-zone focus areas a through e including objects at the same distance at the same time, and the ratio of a single object image occupying each of the multi-zone focus areas a through e is great; i.e., the area of a single object image in each of the multi-zone focus areas a through e is great.

Accordingly, in the present embodiment of the digital camera, if a steep peak contrast can not be obtained by the coarse focus search operation even with the unified focus area α, the fine focus search operation is performed with the multi-zone focus areas a through e. According to the fine focus search operation, a peak contrast value for target objects (the insect 61 and the blades of grass 63 and 65) is obtained on each of the multi-zone focus areas a through e (see FIGS. 7B through 7F).

In the fine focus search operation, contrast values of images in the multi-zone focus areas a through e are determined, respectively, while the focusing lens group L1 is moved stepwise with a fine pitch of movement. FIG. 7B through 7F are illustrations each showing the relationship between different positions of the focusing lens group L1 and contrast values of an object image in one of the multi-zone focus areas a through e.

The present embodiment of the digital camera can perform four different types of searching operations (scanning operations) (Search-Type) having different combinations of a searching range (scanning range), a searching speed (scanning speed) and focus areas.

Two types of searching ranges: a full searching range and a partial searching range are available. The full searching range corresponds to the full distance range from the near extremity to the far extremity, and the partial searching range corresponds to a part of this full distance range.

Three types of searching speeds, i.e., a fast searching speed VA, a medium searching speed VB and a slow searching speed VC are available (VA>VB>VC). For instance, the focusing lens group L1 is moved in steps of one drive pulse, steps of two drive pulses and steps of four drive pulses when driven at the slow searching speed VC, the medium searching speed VB and the fast searching speed VA, respectively.

The focus area defined by the spot AF frame 18a includes the unified focus area α, i.e., the multi-zone focus areas a through e in the spot AF mode, and the focus area defined by the multi-point AF frame 18b includes the unified focus areas α, β and γ, i.e., the multi-zone focus areas a through e, f through j, and k through o. Table 1 below shows the correspondence between these focus areas and the AF modes.

TABLE 1

| Search Type | Searching Range | Searching Speed | Focus Area Spot | Multi-Zone |
|---|---|---|---|---|
| 0 | Full | VA | α | α~γ |
| 1 | Partial | VC | a~e | a~o |
| 2 | Full | VB | α | α~γ |
| 3 | Full | VC | a~e | a~o |

The search type (Search-Type) is a variable for setting the searching range, the searching speed, and the currently-set focus area (areas).

In the present embodiment of the digital camera, search type 0 corresponds to the coarse focus search operation, each of search types 1 and 3 corresponds to a medium focus search operation, and search type 2 corresponds to the fine focus search operation.

Figure 9:
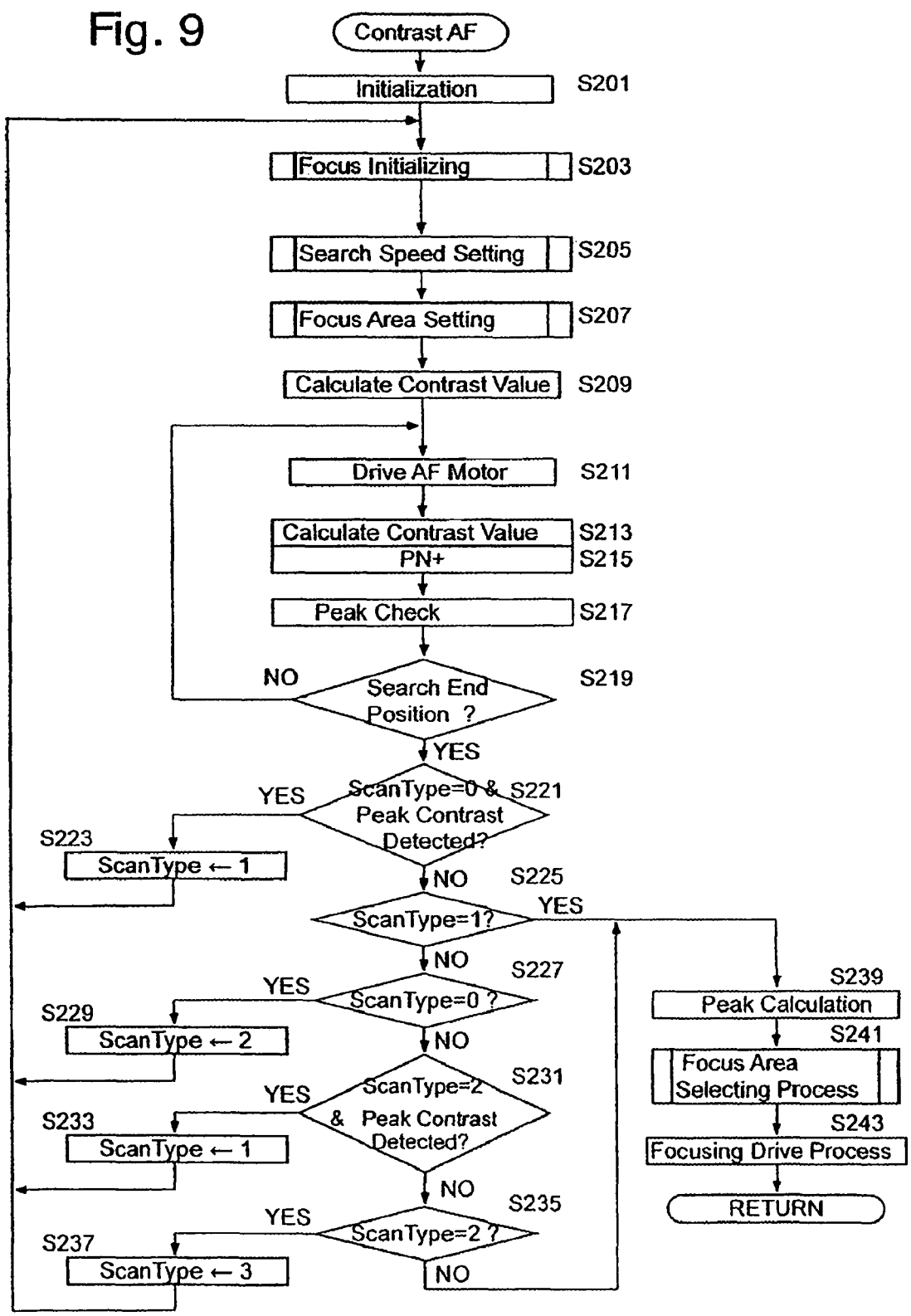
FIG. 9 is a flow chart showing a sub-routine "contrast AF process" performed in the main process shown in FIG. 8.
Figure 10:
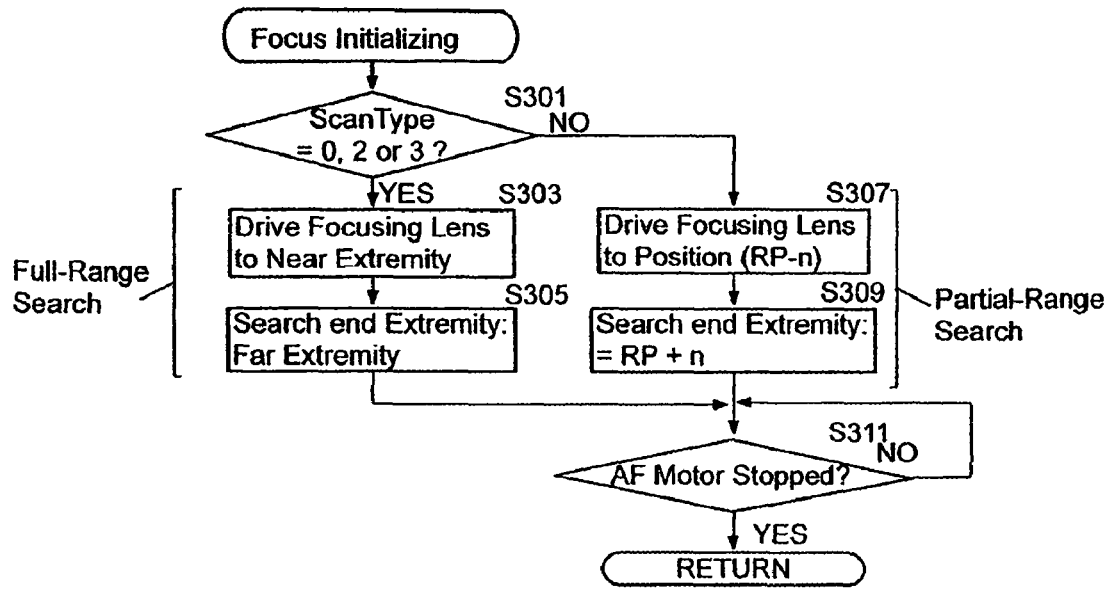
FIG. 10 is a flow chart showing a sub-routine "focus initializing process" performed in the contrast AF process shown in FIG. 9.

The autofocusing process performed in the digital camera 10 will be hereinafter discussed in detail with reference to the flow charts shown in FIGS. 8 through 10.

[Main Process]

Figure 8:
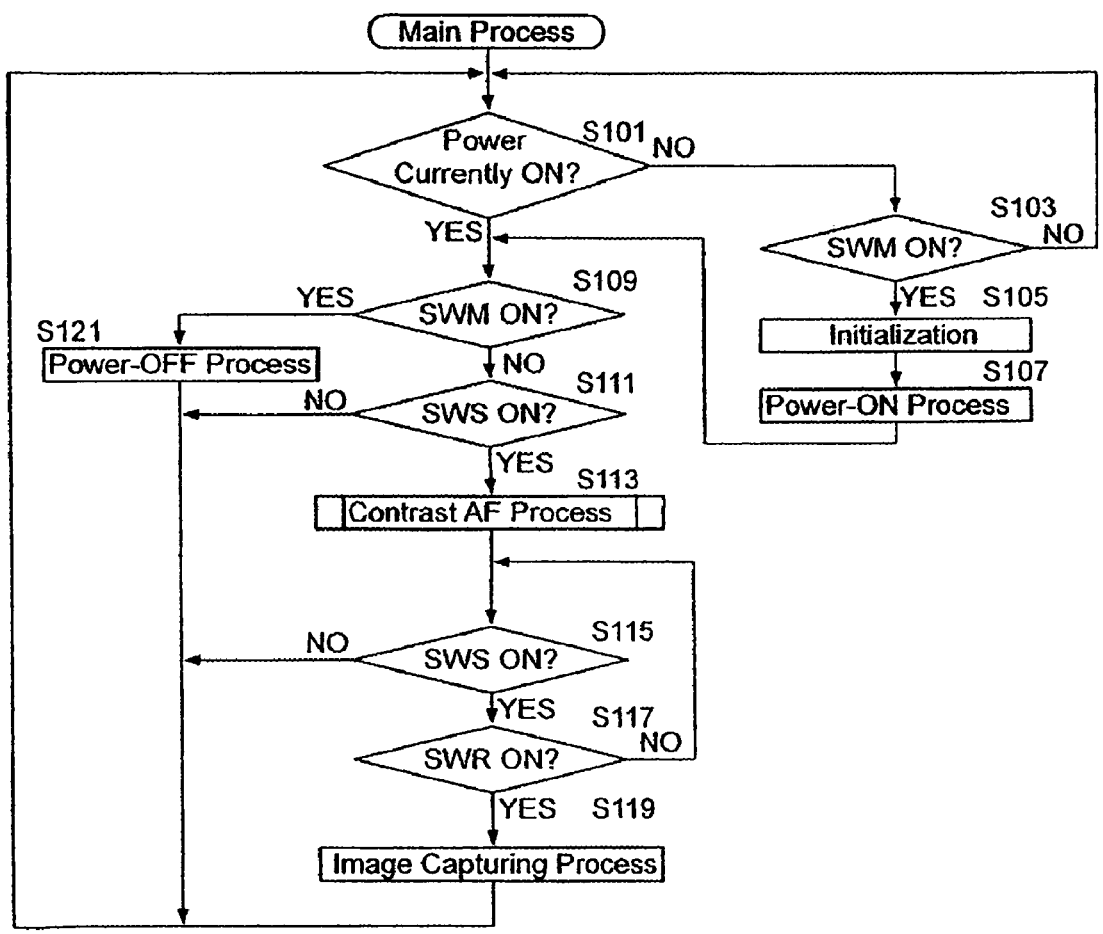
FIG. 8 is a flow chart showing an embodiment of a main process which is performed in the digital camera.

FIG. 8 is a flow chart showing an embodiment of a main process having a sequence of operating steps which is performed in the digital camera 10. Control enters this main process upon a battery (not shown) being loaded into the digital camera 10.

In the main process, firstly it is determined whether or not the power is currently ON (step S101). If the power is not currently ON (if NO at step S101), it is determined whether or not a main switch SWM has changed to the ON state from the OFF state (step S103). If the main switch SWM has not changed to the ON state from the OFF state (if NO at step S103), control returns to step S101. Namely, a main-switch check process consisting of the operations at steps S101 and S103 is repeated to determine whether or not the main switch SWM has changed to the ON state from the OFF state. If the main switch SWM has changed to the ON state from the OFF state (if YES at step S103), hardware/software initialization (initialization of the internal RAM 15a, ports, variables, etc.) is performed (step S105), and a power-ON process in which the power is turned ON to supply power to various parts is performed (step S107), and control proceeds to step S109.

At step S109 it is determined whether or not the main switch SWM has changed to the ON state from the OFF state. If the main switch SWM has not changed to the ON state from the OFF state (if NO at step S109), it is determined whether or not a photometering switch SWS is ON (step S111). If the photometering switch SWS is not ON (if NO at step S111), control returns to step S101. Since control returns to step S101 in a state where the power is ON, it is determined at step S101 that the power is currently ON and control proceeds to step S109. Accordingly, during the time the power remains ON, control repeats a check process including the operations at steps S101 and S109 until the main switch SWM changes to the ON state from the OFF state or the photometering switch SWS is turned ON. Upon the main switch SWM changing to the ON state from the OFF state during the aforementioned check process, a power-OFF process is performed (step S121), and control returns to the aforementioned main-switch check process, which consists of the operations at steps S101 and S103.

Upon the photometering switch SWS being turned ON (if YES at step S111), a contrast AF process (see FIG. 9) is performed to bring a target object into focus by moving the focusing lens group L1 (step S113). Subsequently, it is determined whether or not the photometering switch SWS is ON (step S115). If the photometering switch SWS is ON (if YES at step S115), it is determined whether or not a shutter release button is fully depressed so that a release switch SWR is turned ON (step S117). If the release switch SWR is not ON (if NO at step S117), control returns to step S115 to repeat the operations at steps S115 and S117 to determined whether or not the photometering switch SWS and the release switch SWR are ON, respectively.

Upon the release switch SWR being turned ON (if YES at step S117), an image capturing process is performed (step S119), and control returns to step S101. If the photometering switch SWS is turned OFF (if NO at step S115), control simply returns to step S101.

[Contrast AF Process]

The contrast AF process that is performed at steps S113 will be hereinafter discussed in detail with reference further to the flow chat shown in FIG. 9.

In the contrast AF process, firstly various variables, etc., are initialized (step S201). For instance, in this particular embodiment, each status (flag) is cleared (i.e., set to 0), contrast values are cleared, a lens-position pulse number PN is initialized (PN=0), the maximum contrast value is set to 0, the minimum contrast value is set to FFFFFFFF, and the search type (initial value is 0) is initialized.

Contrast values are those actually obtained from pixels in each focus area.

Given that the lens-position pulse number PN is 0 when the focusing lens group L1 is positioned at the closest focus position that serves as the initial position of the focusing lens group L1, the lens-position pulse number PN is a variable which is incremented by one by the CPU 15 every time the encoder 26 outputs one pulse (drive pulse) when the AF motor 25 is driven in the direction toward the infinite focus position. When the focusing lens group L1 is driven at the fast searching speed VA, the encoder 26 outputs drive pulses in steps of four drive pulses, so that the lens-position pulse number PN is incremented by four. When the focusing lens group L1 is driven at the medium searching speed VB, the encoder 26 outputs drive pulses in steps of two drive pulses, so that the lens-position pulse number PN is incremented by two. When the focusing lens group L1 is driven at the slow searching speed VC, the encoder 26 outputs drive pulses in steps of one drive pulse, so that the lens-position pulse number PN is incremented by one.

The maximum contrast value and the minimum contrast value are variables to which actually-obtained maximum and minimum contrast values are assigned, respectively.

As shown in Table 1 above, the search type (Search-Type) is a variable for setting the searching range, the searching speed, and the currently-set focus area.

Subsequently, a focus initializing process (see FIG. 10) is performed (step S203). In the focus initializing process, the focusing lens group L1 is moved to a search start extremity thereof. When the focus initializing process is performed for the first time after control enters the contrast AF process, the focusing lens group L1 is moved to the near extremity.

Subsequently, a searching speed setting process (see FIG. 11) is performed (step S205) and the focus area is set (step S207). Since the search type is set to 0 when control enters the contrast AF process for the first time, the searching speed is set to the fast searching speed VA. The central unified focus area α is set in the case of the spot AF mode, and the unified focus areas α, β and γ are set in the case of the multi-point AF mode.

Subsequently, image data at the search start extremity of the focusing lens group L1 in the focus search process (the near extremity of the focusing lens group L1 when the focus initializing process is performed for the first time) is captured, and thereupon a contrast value calculating process is performed (step S209). Namely, based on the image data input from the image pickup device 11, the contrast value P[0] at the initial position of the focusing lens group L1 is calculated, and the maximum contrast value Max and the minimum contrast value Min are updated.

Subsequently, the AF motor 25 is driven by the number of steps corresponding to the searching speed in the direction to move the focusing lens group L1 toward the search end extremity (step S211). Subsequently, a contrast value calculating process is performed (step S213). In the contrast value calculating process, a contrast value P[PN] is calculated in accordance with image data input from the image pickup device 11, and the maximum contrast value and the minimum contrast value are updated. Subsequently, the lens-position pulse number PN is incremented by the number of drive pulses output from the encoder 26 (step S215).

Subsequently, a peak check process is performed which determines whether or not the contrast value P[PN] calculated at step S209 is a peak contrast value (maximum contrast value) which satisfies preset conditions (step S217). The contrast value calculating process at step S213 and the peak check process at step S215 are performed on all the focus areas selected at step S207.

Subsequently, it is determined whether or not the focusing lens group L1 has reached the search end extremity thereof (step S219). If the focusing lens group L1 has not reached the search end extremity thereof (if NO at step S219), control returns to step S211, so that the operations at steps S211 through S219 are repeated while the focusing lens group L1 is moved stepwise toward the search end extremity at the searching speed (with the pitch of movement of the focusing lens group L1) set at step S205.

If it is determined that the focusing lens group L1 has reached the search end extremity thereof (if YES at step S219), control comes out of the loop at steps S211 through S219 to proceed to step S221. The above described focus search operation, i.e., steps S203 through S219, with the search type 0 corresponds to the first search stage.

Upon control coming out of the loop at steps S211 through S219 (if YES at step S219), it is determined which of search types 0, 1 and 2 is the currently-set search type and it is determined whether a peak contrast exists (i.e., whether or not an in-focus position has been detected) (steps S221, S225, S227, S231 and S235). First of all, it is determined whether or not the currently-set search type is search type 0 and whether a peak contrast exists (step S221). If the currently-set search type is search type 0 and a peak contrast exists (if YES at step S221), the search type is set to 1 and control returns to step S203. Namely, if a peak contrast is obtained by the coarse focus search operation, the search type is set to 1 to perform a focus search operation using the multi-zone focus areas at a finer step (step S223), and control returns to step S203. Upon control returning to the focus initializing process at step S203, the focusing lens group L1 is moved to the position (focus search commencement position) thereof which corresponds to the aforementioned position RP from which n number of pulses is subtracted, and the position of the focusing lens group L1 to which n number of pulses is added is set as a focus search end position. Thereafter, a peak contrast is searched based on image data in the multi-zone focus areas a through e while the focusing lens group L1 is being moved at the slow searching speed VC over the range of movement of the focusing lens group L1 from the position RP from which n number of pulses (RP−n) to the position RP to which n number of pulses is added (RP+n). This focus search operation (i.e., step S221; YES, and steps S203 through S219) corresponds to the second search stage.

It is determined that the currently-set search type is not search type 0 or that no peak contrast (in-focus position) could be detected even if the currently-set search type is search type 0, it is determined whether or not the currently-set search type is search type 1 (step S225). If the currently-set search type is search type 1 (if YES at step S225), a peak calculation process for calculating a peak contrast value is performed in accordance with contrast values obtained based on image data in each of the multi-zone focus areas a through e by a focus search operation of search type 1 (step S239), a focus area selecting process (see FIG. 12) is performed (step S241), a focusing drive process is performed in which the focusing lens group L1 is moved to the peak position (in-focus lens position) thereof calculated on the focus area selected at step S241 (step S243), and control returns. For instance, in the focus area selecting process, a focus area having a peak position corresponding to the shortest distance is selected.

If it is determined that the currently-set search type is not search type 1 (if NO at step S225), it is determined whether or not the currently-set search type is search type 0 (step S227). If the currently-set search type is search type 0 (if YES at step S227), the search type is set to 2 and control returns to step S203. In this case, upon control returning to the focus initializing process at step S203, the focusing lens group L1 is moved to the near extremity, and the far extremity is set as the focus search end position. It is determined at step S227 that the currently-set search type is search type 0 when control enters the operation at step S227 as a result of a peak contrast not being able to be detected even though a focus search operation of search type 0 was performed. Namely, if a peak contrast cannot be detected even though the coarse focus search operation of search type 0 is performed, a peak contrast is searched based on image data in the unified focus areas α, β and γ while the focusing lens group L1 is being driven at the searching speed VB over the entire range by a focus search operation of search type 2. This focus search process (i.e., step S227, YES; and steps S229 and S203 through S219) corresponds to the third search stage.

If it is determined that the currently-set search type is not search type 0 (if NO at step S227), it is determined whether or not the currently-set search type is search type 2 and whether a peak contrast exists (step S231). If the currently-set search type is search type 2 and a peak contrast exists (if YES at step S231), the search type is set to 1 (step S233) and control returns to step S203. In the focus initializing process at step S203, the focusing lens group L1 is moved to the position (focus search commencement position) thereof which corresponds to the position RP from which n number of pulses is subtracted (RP−n), and the position of the focusing lens group L1 to which n number of pulses is added (RP+n) is set as a focus search end position. Namely, the range of movement of the focusing lens group L1 for the focus search operation is limited to a narrow range (the position RP±n), and a peak contrast is searched at the slow searching speed VC on each of the multi-zone focus areas a through e. This focus search process (i.e., steps S231, YES; S233 and S203 through S219) corresponds to the fourth search stage.

If it is determined that the currently-set search type is not search type 2 or if no peak contrast exists even if the currently-set search type is search type 2 (if NO at step S231), it is determined whether or not the currently-set search type is search type 2 (step S235). If the currently-set search type is search type 2 (if YES at step S235), the search type is set to 3 (step S237) and control returns to step S203. In this case, in the focus initializing process at step S203, the focusing lens group L1 is moved to the near extremity, and the far extremity is set as the focus search end position. It is determined at step S235 that the currently-set search type is search type 2 when control enters the operation at step S235 as a result that a peak contrast could not be detected though a focus search operation of search type 2 set at step S229 was performed. Accordingly, a peak contrast is searched on the multi-zone focus areas a through e while the focusing lens group L1 is being driven at the slowest searching speed, i.e., the slow searching speed VC, over the entire range by a focus search operation of search type 3. This focus search process (i.e., steps S235, YES; S237, and S203 through S219) corresponds to the fifth search stage.

If the currently-set search type is not search type 2 (if NO at step S235), the peak calculation process is performed (step S239), the focus area selecting process is performed (step S241), the focusing drive process, in which the focusing lens group L1 is moved to the peak position (in-focus lens position) thereof calculated on the focus area selected at step S241, is performed, and control returns. It is determined at step S235 that the currently-set search type is not 2 when the search type has been set to 3 at step S237.

[Focus Initializing Process]

The focus initializing process that is performed at step S203 in the contrast AF process will be hereinafter discussed in detail with reference to the flow chart shown in FIG. 10. In the focus initializing process, firstly it is determined whether or not the currently-set search type is 0, 2 or 3 (step S301). In each of search types 0, 2 and 3, the searching range is the full searching range from the near extremity to the far extremity. If the currently-set search type is 0, 2 or 3 (if YES at step S301), the focusing lens group L1 commences to be driven toward the near extremity (step S303), and the far extremity is set as the focus search end position (step S305). Thereafter, it is determined whether or not the AF motor 25 has stopped as a result of the focusing lens group L1 reaching the near extremity (step S311). If the AF motor 25 has stopped thereby (if YES at step S311), control returns.

It is determined that the currently-set search type is none of 0, 2 and 3 (if NO at step S301), i.e., if the currently-set search type is 1, the focusing lens group L1 commences to be driven toward the position (focus search commencement position) thereof which corresponds to the position RP from which n number of pulses is subtracted (RP−n) (step S307), and the position of the focusing lens group L1 to which n number of pulses is added (RP+n) is set as the focus search end position (step S309). Thereafter, it is determined whether or not the AF motor 25 has stopped as a result that the focusing lens group L1 reaching the aforementioned focus search commencement position thereof (RP−n) (if YES at step S311). If the AF motor 25 has stopped (if YES at step S311), control returns.

Drive control for the AF motor 25 in the present embodiment of the digital camera is performed by a motor-control routine independent of the focus initializing process.

[Searching Speed Setting Process]

Figure 11:
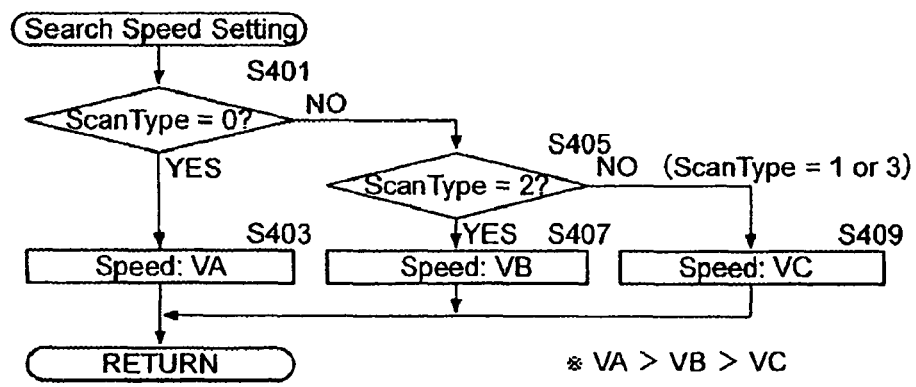
FIG. 11 is a flowchart showing a sub-routine "searching speed setting process" performed in the contrast AF process shown in FIG. 9.

The searching speed setting process that is performed at step S205 will be hereinafter discussed with reference to the flow chart shown in FIG. 11. In the searching speed setting process, firstly it is determined whether or not the search type is 0 (step S401). If the search type is 0 (if YES step S401), the searching speed is set to VA (step S403), and control returns.

If the search type is not 0 (if NO step S401), it is determined whether or not the currently-set search type is 2 (step S405). If the currently-set search type is 2 (if YES at step S405), the searching speed is set to VB (step S407), and control returns.

If the search type is not 2 (if NO step S405), i.e., if the search type is 1 or 3, the searching speed is set to VC (step S409), and control returns.

[Focus Area Setting Process]

Figure 12:
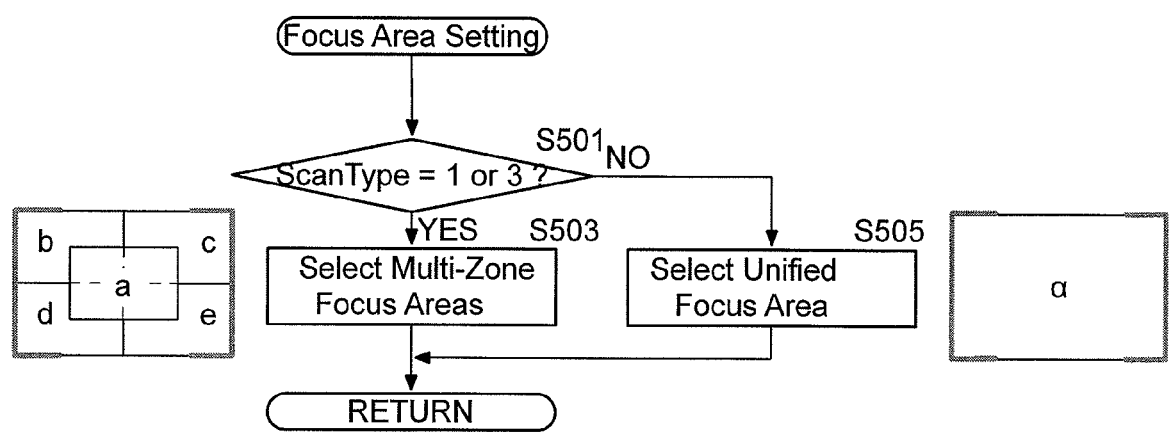
FIG. 12 is a flow chart showing a sub-routine "focus area selecting process" performed in the contrast AF process shown in FIG. 9.

The focus area setting process that is performed at step S207 will be hereinafter discussed with reference to the flow chart shown in FIG. 12. In the focus area setting process, firstly it is determined whether or not the search type is 1 or 3 (step S501). If the search type is 1 or 3 (if YES at step S501), the multi-zone focus areas a through e are selected as active focus areas in the case of the spot AF mode or the multi-zone focus areas a through o are selected as active focus areas in the case of the multi-point AF mode (step S503), and control returns. If it is determined that the search type is neither 1 nor 3 (if NO at step S501), i.e., if the search type is 0 or 2, the unified focus area a is selected as an active unified focus area in the case of the spot AF mode or the unified focus areas α, β and γ are selected as active unified focus areas in the case of the multi-spot AF mode (step S505), and control returns.

When the multi-point AF mode is selected as an AF mode, it is desirable that firstly a peak contrast (in-focus position) be detected on each of the unified (large) focus areas α, β and γ at the aforementioned first search stage and that focus search operations of search types 1, 2 and 3 (the aforementioned second through fifth search stages) be performed on one of the unified focus areas α, β and γ in which a peak contrast corresponding to the shortest distance is obtained and the multi-zone (small) focus areas (a through e, f through j, or k through o) of this one of the unified focus areas α, β or γ.

In an alternative embodiment, if an in-focus position detected by a focus search operation of search type 0 is closer to the near extremity than a predetermined distance, focus search operations of search types 1 through 3 (second through fifth search stages) are performed. In this case, if the in-focus position thus detected is not closer to the near extremity than the predetermined distance, it is possible to move the focusing lens group to the detected in-focus position.

The digital camera 10 is configured to include a photographing-mode selecting device for selecting a photographing mode from among various photographing modes such as macro mode and super-macro mode, to perform the first search stage and the subsequent search stages if the aforementioned macro mode or super-macro mode has been selected by the photographing-mode selecting device, and to perform a focus search operation based on images in the unified focus areas α, β and γ while moving the focusing lens group L1 stepwise over the range of movement thereof, desirably at the slow searching speed VC, to move the focusing lens group L1 to an in-focus position obtained by this focus search operation.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A focus adjusting method for adjusting focus by moving a focusing lens group of a photographing optical system,
    wherein said focus adjusting method performs a focus search process in which a focus state is obtained to detect an in-focus position of said focusing lens group based on a contrast of an image formed by said photographing optical system, in one of at least one large focus area and each of a plurality of small focus areas included in said large focus area, while said focusing lens group is moved stepwise from one toward the other of a near extremity and a far extremity, and moves said focusing lens group to said in-focus position,
    wherein said focus adjusting method comprises:
    a first search stage at which a focus search operation is performed based on an image formed in said large focus area while said focusing lens group is moved stepwise over an entire range of movement thereof from said near extremity to said far extremity, and
    a second search stage at which said focus search operation is performed, based on images formed in said plurality of small focus areas, at front and rear close vicinities of said in-focus position while said focusing lens group is moved stepwise over a portion of said entire range of movement thereof.

2. The focus adjusting method according to claim 1, wherein said focusing lens group is moved stepwise by a first pitch of movement at said first search stage, and
    wherein said focusing lens group is moved stepwise by a third pitch of movement at said second search stage, said third pitch of movement being narrower than said first pitch of movement.

3. The focus adjusting method according to claim 1, further comprising a focusing drive stage which is performed after said second search stage and at which said focusing lens group is moved to an in-focus position obtained at said second search stage.

4. The focus adjusting method according to claim 2, further comprising a third search stage which replaces said second search stage when said in-focus position is not obtained at said first search stage,
    wherein, at said third search stage, said focus search operation is performed based on said image formed in said large focus area while said focusing lens group is moved stepwise over said entire range of movement thereof with a second pitch of movement which is narrower than said first pitch of movement and wider than said third pitch of movement.

5. The focus adjusting method according to claim 4, further comprising a fourth search stage, at which said focus search operation is performed based on said images formed in said plurality of small focus areas while said focusing lens group is moved stepwise over a portion of said entire range of movement thereof at front and rear close vicinities of an in-focus position obtained at said third stage.

6. The focus adjusting method according to claim 5, further comprising a focusing drive stage which is formed after said fourth search stage and at which said focusing lens group is moved to an in-focus position obtained at said fourth search stage.

7. The focus adjusting method according to claim 4, further comprising a fifth search stage at which said focus search operation is performed based on said images formed in said plurality of small focus areas while said focusing lens group is moved stepwise over said entire range of movement thereof by said third pitch of movement when said in-focus position is not obtained at said third search stage.

8. The focus adjusting method according to claim 7, further comprising a focusing drive stage which is performed after said fifth search stage and at which said focusing lens group is moved to an in-focus position obtained at said fifth search stage.

9. The focus adjusting method according to claim 1, wherein said plurality of small focus areas comprise:
    first small focus areas formed by dividing said wide focus area; and a second small focus area which overlap said first small focus areas.

10. The focus adjusting method according to claim 7, wherein, in when said large focus area comprises a plurality of large focus areas, said second search stage, said third search stage, said fourth search stage and said fifth search stage are carried out on one of said plurality of large focus areas in which an in-focus position at a shortest distance is obtained at said first search stage and on said plurality of small focus areas included in said one of said plurality of large focus areas.

11. The focus adjusting method according to claim 7, wherein said second search stage, said third search stage, said fourth search stage and said fifth search stage are carried out when said in-focus position obtained at said first search stage is closer to a predetermined distance.

12. The focus adjusting method according to claim 11, further comprising a focusing drive stage at which said focusing lens group is moved to said in-focus position in the case where said in-focus position is not closer to said predetermined distance.

13. The focus adjusting method according to claim 1, further comprising a photographing-mode selecting stage for selecting a photographing mode from among a plurality of photographing modes including a macro mode and a super-macro mode,
 wherein said first search stage and subsequent search stages are carried out when one of said macro mode and said super-macro mode is selected at said photographing-mode selecting stage, and
 wherein said focus adjusting method further comprises a focusing drive stage at which a focus search operation is performed based on said image formed in said large focus area while said focusing lens group is moved stepwise over said entire range of movement thereof to move said focusing lens group to an in-focus position obtained by said focus search operation at said focusing drive stage.

14. The focus adjusting method according to claim 1, wherein said large focus area is defined by an AF frame formed at a position corresponding to a center of a picture plane.

15. The focus adjusting method according to claim 1, wherein said large focus area comprises a central large focus area and two side focus areas positioned on opposite sides of said central large focus areas, respectively,
 wherein said central large focus area is defined by a spot AF frame, and
 wherein a combination of said central large focus area and said two side focus areas are defined by a multi-zone AF frame which is greater in width than said spot AF frame.

16. A focus adjusting device comprising:
 a lens driver that moves a focusing lens group of a photographing optical system stepwise in a range of movement from one toward the other of a near extremity and a far extremity;
 an image pickup that captures an image formed by said photographing optical system; and
 a controller which performs a focus search stage in which said image pickup is activated to capture an object image at each of a plurality of different positions of said focusing lens group while said focusing lens group is moved stepwise from one toward the other of a near extremity and a far extremity to obtain an in-focus state based on a contrast of an image formed by said photographing optical system in one of at least one large focus area and each of a plurality of small focus areas included in said large focus area,
 wherein the focus search stage performed by the controller includes:
 a first search stage at which a focus search operation is performed based on an image formed in said large focus area while said focusing lens group is moved stepwise over an entire range of movement thereof from said near extremity to said far extremity, and
 a second search stage at which said focus search operation is performed, based on images formed in said plurality of small focus areas, at locations in front of and at rear of a vicinity of an in-focus position of said focusing lens group while said focusing lens group is moved stepwise over a portion of said entire range of movement thereof, the in-focus state being obtained at the in-focus position of said focusing lens group.

* * * * *